United States Patent
Chang et al.

(10) Patent No.: US 6,446,224 B1
(45) Date of Patent: *Sep. 3, 2002

(54) METHOD AND APPARATUS FOR PRIORITIZING AND HANDLING ERRORS IN A COMPUTER SYSTEM

(75) Inventors: Chih-Wei David Chang, Saratoga; Joel Frederick Boney, Cupertino; Jaspal Kohli, Sunnyvale, all of CA (US)

(73) Assignee: Fujitsu Limited (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/397,910

(22) Filed: Mar. 3, 1995

(51) Int. Cl.$^7$ ................................................. H02H 3/05
(52) U.S. Cl. ............................ 714/54; 714/47; 714/43
(58) Field of Search ..................... 395/183.1, 183.01, 395/183.21; 364/241.2, 241.5, 241.6, 242.2, 239.6; 714/47, 48, 43, 54

(56) References Cited

U.S. PATENT DOCUMENTS

| | | | | |
|---|---|---|---|---|
| 3,573,745 A | * | 4/1971 | May, Jr. ................... | 340/172.5 |
| 4,321,477 A | | 3/1982 | Bartlett ..................... | 307/35 |
| 4,850,027 A | * | 7/1989 | Kimmel ..................... | 382/49 |
| 4,866,712 A | | 9/1989 | Chao ......................... | 371/5.1 |
| 4,980,852 A | * | 12/1990 | Giroir et al. ............... | 364/900 |
| 5,163,151 A | * | 11/1992 | Bronikowski et al. ...... | 395/725 |
| 5,471,510 A | * | 11/1995 | Renault et al. ............. | 375/372 |
| 5,632,028 A | | 5/1997 | Thusoo et al. ............. | 395/500 |
| 5,638,312 A | | 6/1997 | Simone ..................... | 364/736.5 |
| 5,644,742 A | | 7/1997 | Shen et al. ................. | 395/591 |
| 5,649,136 A | | 7/1997 | Shen et al. ................. | 395/591 |
| 5,651,124 A | | 7/1997 | Shen et al. ................. | 395/391 |
| 5,659,721 A | | 8/1997 | Shen et al. ................. | 395/569 |
| 5,673,408 A | | 9/1997 | Shebanow et al. .......... | 395/375 |
| 5,673,426 A | | 9/1997 | Shen et al. ................. | 395/591 |
| 5,680,566 A | | 10/1997 | Peng et al. ................. | 395/393 |
| 5,687,353 A | | 11/1997 | Chen et al. ................. | 395/482 |
| 5,689,673 A | | 11/1997 | Kitahara ..................... | 395/391 |
| 5,708,788 A | | 1/1998 | Katsuno et al. ............. | 395/390 |
| 5,740,414 A | | 4/1998 | Tovey et al. ................ | 395/580 |
| 5,745,726 A | | 4/1998 | Shebanow et al. .......... | 395/392 |
| 5,751,985 A | | 5/1998 | Shen et al. ................. | 395/394 |
| 5,776,805 A | | 7/1998 | Kim ........................... | 438/182 |
| 5,784,586 A | | 7/1998 | Simone et al. .............. | 395/392 |
| 5,835,962 A | | 11/1998 | Chang et al. ............... | 711/206 |
| 5,860,152 A | | 1/1999 | Savkar ....................... | 711/213 |
| 5,896,528 A | | 4/1999 | Katsuno et al. ............. | 395/586 |
| 5,966,530 A | | 10/1999 | Shen et al. ................. | 395/591 |

\* cited by examiner

*Primary Examiner*—Norman M. Wright
(74) *Attorney, Agent, or Firm*—Fenwick & West, LLP

(57) ABSTRACT

A computer system includes a central processing unit and a memory management unit having a plurality of functional units, such as a memory interface unit, a remote interface unit, a cache interface unit, and a translation unit. Each functional unit has a low priority error queue for storing error information for errors having a low priority. Some functional units also have a high priority error queue for storing error information for errors having a high priority error. Based on the status of the error queues, the memory management unit prioritizes and handles errors caused by hardware failures. For low priority errors, an interrupt request signal is sent to the central processing unit. For high priority errors, a RED ALERT signal is sent to the processing unit to cause the processing unit to give immediate attention to the error. For high priority error queue overflows, a failure signal is generated which causes the system to be halted and the contents of the system to be scanned out. Thus, errors are prioritized and handled accordingly.

15 Claims, 3 Drawing Sheets

METHOD AND APPARATUS FOR PRIORITIZING AND HANDLING ERRORS IN A COMPUTER SYSTEM

RELATED APPLICATION

The subject matter of this application is related to the subject matter of the following applications:

application Ser. No. 08/388,602 entitled "APPARATUS AND METHOD FOR CONTROLLING INSTRUCTION FLOW BY USING A MATRIX OF TRANSMISSION GATES IN SUPER-SCALER MICROPROCESSOR AND SELECTIVELY DELAYING MICROPROCESSOR INSTRUCTION EXECUTION BASED ON RESOURCE AVAILABILITY" filed on Feb. 14, 1995, by Takeshi Kilahara, now U.S. Pat. No. 5,689,673;

application Ser. No. 5,784,586 entitled "ADDRESSING METHOD FOR EXECUTING LOAD INSTRUCTIONS OUT OF ORDER WITH RESPECT TO STORE INSTRUCTIONS" filed on Feb. 14, 1995, by Michael A. Simone and Michael C. Shebanow now U.S. Pat. No. 5,784,586;

application Ser. No. 08/389,606 entitled "METHOD AND APPARATUS FOR EFFICIENTLY WRITING RESULTS TO RENAMED REGISTERS" filed on Feb. 14, 1995, by DeForest W. Tovey, Michael C. Shebanow and John Gmuender, now abandoned;

application Ser. No. 08/388,364 entitled "METHOD AND APPARATUS FOR COORDINATING THE USE OF PHYSICAL REGISTERS IN A MICROPROCESSOR" filed on Feb. 14, 1995, by DeForest W. Tovey, Michael C. Shebanow and John Gmuender;

application Ser. No. 08/390,885 entitled "PROCESSOR STRUCTURE AND METHOD FOR TRACKING INSTRUCTION STATUS TO MAINTAIN PRECISE STATE" filed on Feb. 14, 1995, by Gene W. Shen, John Szeto, Niteen A. Patkar and Michael C. Shebanow;

application Ser. No. 08/772,834 which is a continuation to the patent application entitled "PARALLEL ACCESS MICRO-TLB TO SPEED UP ADDRESS TRANSLATION" filed on Mar. 3, 1995, by Chih-Wei David Chang, Kioumars Kawallu, Joel F. Boney, Ming-Ying Li and Jen-Hong Charles Chen;

application Ser. No. 08/464,152 filed Jun. 6, 1995, which is a continuation of the application entitled "LOOKASIDE BUFFER FOR ADDRESS TRANSLATION IN A COMPUTER SYSTEM" filed on Mar. 3, 1995, by Leon Kuo-Liang Peng, Yolin Lih and Chih-Wei David Chang;

application Ser. No. 09/397,893 entitled "RECLAMATION OF PROCESSOR RESOURCES IN A DATA PROCESSOR" filed on Mar. 3, 1995, by Michael C. Shebanow, Gene W. Shen, Ravi Swami and Niteen Parkar;

application Ser. No. 08/528,384 entitled "METHOD AND APPARATUS FOR SELECTING THE OLDEST QUEUED INSTRUCTIONS WITHOUT DATA DEPENDENCIES" filed on Sep. 3. 1995, by Michael C. Shebanow. John Gmuender, Michael A. Simone, Jobn R. F. S. Szeto, Takumi Maruvama and Deforest W. Tovey application Ser. No. 08/397.891 entitled "METHOD AND APPARATUS FOR SELECTING INSTRUCTIONS FROM ONES READY TO EXECUTE" filed on Mar. 3, 1995, by Michael C. Shebanow, John Gmuender, Michael A. Simone, John R. F. S. Szeto, Takumi Maruyama and DeForest W. Tovey, now abandoned;

application Ser. No. 08/397,911 entitled "HARDWARE SUPPORT FOR FAST SOFTWARE EMULATION OF UNIMPLEMENTED INSTRUCTIONS" filed on Mar. 3, 1995, by Shalesh Thusoo, Farnad Sajjadian, Jaspal Kohli and Niteen Parkar;

application Ser. No. 08/398,294 entitled "METHOD AND APPARATUS FOR ACCELERATING CONTROL TRANSFER RETURNS" filed on Mar. 3, 1995, by Akiro Katsuno, Sunil W. Savkar and Michael C. Shebanow;

application Ser. No. 08/398,060 entitled "METHODS FOR UPDATING FETCH PROGRAM COUNTER" filed on Mar. 3, 1995, by Akira Katsuno, Niteen A. Patkar, Sunil Savkar and Michael C. Shebanow;

application Ser. No. 08/397,910 entitled "METHOD AND APPARATUS FOR REPID EXECUTION OF CONTROL TRANSFER INSTRUCTIONS" filed on Mar. 3, 1995, by Sunil Savkar;

application Ser. No. 08/397,800 entitled "METHOD AND APPARATUS FOR GENERATING A ZERO BIT STATUS FLAG IN A MICROPROCESSOR" filed on Mar. 3, 1995, by Michael Simone; and, application Ser. No. 08/397,912 entitled "ECC PROTECTED MEMORY ORGANIZATION WITH PIPELINED READ-MODIFY-WRITE ACCESS" filed on Mar. 3, 1995, by Chien Chen and Yizhi Lu;

each of the above applications having the same assignee as the present invention, and each incorporated herein by reference in their entirety.

FIELD OF THE INVENTION

This invention relates generally to computer systems and more particularly to a method and apparatus for prioritizing and handling hardware errors in a computer system.

BACKGROUND OF THE INVENTION

In recent years, computer systems have progressively become larger and more complex. The larger a computer system is, the more components it contains, and the more components there are, the greater the chances of hardware failure. As a result, for very large and complex computer systems, hardware failures are practically inevitable. Since hardware failure is almost a given, the important issue in large-scale computer systems becomes the manner in which hardware failures or errors are handled.

Hardware failures fall into several different categories. A first category is that of correctable failure. For this type of failure, operation of the computer system need not be immediately interrupted since the error can be corrected. A second category is that of non-correctable error. With this type of failure, system operation is immediately interrupted in order to prevent the system from using corrupted data or executing a corrupted instruction. This type of hardware failure typically causes the system to re-execute an instruction or to repeat a particular process. A third type of hardware failure is one in which there is no possibility of recovery. With this type of failure, the system needs to be shut down and restarted. As can be seen from this discussion, the different categories of hardware failures require different handling, In order to maximize system efficiency, hardware failures should be prioritized and handled accordingly. Currently, however, there is no system believed to be available which carries out this function satisfactorily and efficiently.

SUMMARY OF THE INVENTION

In accordance with the present invention, there is provided a computer system wherein hardware failures are efficiently prioritized and handled. In the preferred embodiment, the computer system comprises a central processing unit (CPU), at least one cache, and a memory management unit (MMU) wherein a plurality of low priority and high priority error queues are maintained. Each queue is associated with a selected unit of the MMU. Whenever a low priority error (e.g. a correctable error) is detected in one of the MMU units, an entry is loaded into the low priority queue associated with that MMU unit. Once loaded with an entry, the low priority queue sends out a control signal indicating that a low priority error has occurred. In response, the MMU sends an interrupt request signal to the CPU. Depending on the level of the interrupt request (which may be set by a user) and the status of a mask register within the CPU (which may also be set by a user), the interrupt may either be serviced by the CPU or it may be ignored for the time being. Regardless of which action is taken by the CPU, system operation continues because the error is correctable. Primarily, entries in the low priority error queues are used for purposes of logging the hardware failure for subsequent analysis.

On the other hand, if a high priority error (e.g. a non-correctable error) is encountered by one of the MMU units, then an entry is loaded into the high priority error queue associated with that MMU unit. Once that is done, the high priority queue sends out a control signal indicating that a non-correctable error has been detected. In response, the MMU sends a RED ALERT control signal to the CPU to cause the CPU to give immediate attention to the error. Thus, a non-correctable error is given much higher priority than a correctable error. In general, non-correctable errors may cause termination of the currently executing instruction or program but it usually does not necessitate halting the whole system.

Finally, it may be possible that one or more of the high priority error queues may overflow, thereby indicating that more non-correctable errors have been detected than the system can handle. If this happens, then one or more of the high priority queues will issue an overflow signal. In response to this overflow signal, the MMU will issue a control signal to stop the system clock. This serves to freeze the system at the current state. Thereafter, the contents of the system are scanned out to ascertain the internal states of the system. This process is preferably carried out only when it becomes clear that recovery from non-correctable errors or failures is not possible, i.e. when one or more of the high priority queues overflows.

As shown by the above discussion, the present invention prioritizes hardware failures based on the type of hardware error. In addition, each type of failure is handled in an efficient manner suitable for the type of error. Overall, the present invention provides an efficient and effective means for prioritizing and handling hardware failures.

DETAILED DESCRIPTION OF THE PREFERRED EMBODIMENTS

Figure 1:
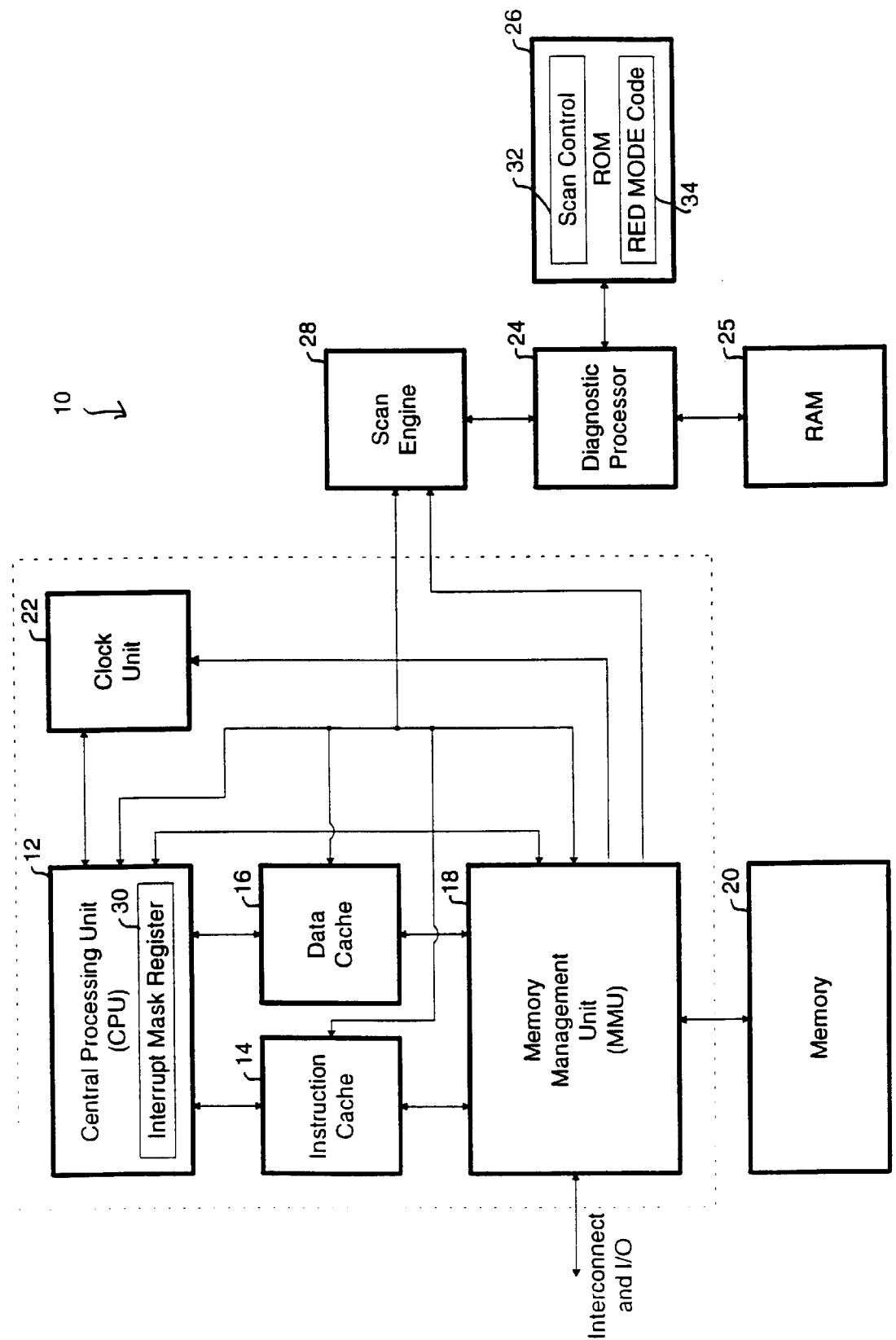
FIG. 1 is a block diagram representation of a computer system 10 wherein the present invention is implemented.

With reference to FIG. 1, there is shown a computer system 10 wherein the present invention is implemented, the system 10 preferably comprising a central processing unit (CPU) 12, an instruction cache 14 for storing recently executed instructions, a data cache 16 for storing recently accessed data, a memory 20, a memory management unit (MMU) 18 for coordinating access to the memory 20, and a clock unit 22. System 10 preferably also comprises a diagnostic processor 24, a random access memory (RAM) 25, a read-only-memory (ROM) 26, and a scan engine 28. As will be explained later, components 24–28 are used for error handling purposes. In the preferred embodiment, the CPU 12 preferably takes the form of a superscalar processor capable of executing a plurality of instructions simultaneously. It should be noted, though, that CPU 12 is not required to be superscalar. Other types of CPU may also be used.

In system 10, normal operational flow is as follows. The CPU 12 initiates operation by generating a virtual address. This virtual address is compared with the address tags stored within the instruction and data caches 14, 16. If a "hit" is found, then the data or instruction is fetched from the caches 14, 16. On the other hand, if a "miss" is encountered, then the virtual address is passed on to the MMU 18 for processing. Upon receiving the virtual address, the MMU 18 responds by translating the virtual address into an address which can be used to access the memory 20, and then fetching the instruction or data from the memory 20. Thereafter, the requested data or instruction is passed on to the CPU 12 for processing.

In general, MMU 18 of system 10 performs five major functions. First, MMU 18 translates virtual addresses from the CPU 12 into addresses which can be used to access the memory 20. Second, MMU 18 provides an interface to the memory 20 for accessing and retrieving information therefrom. Third, MMU 18 provides an interface to the caches 14, 16 so that when information is retrieved from the memory 20, the information is stored into one of the caches. Fourth, MMU 18 provides an interface to the interconnect system (i.e. bus system) and input/output (I/O) devices. This interface is used, for example, to control direct memory access (DMA) between an external device and the memory 20. In addition to the previous functions, MMU 18 preferably further performs the error prioritization and handling function of the present invention. This function will be described in greater detail in a subsequent section.

Figure 2:
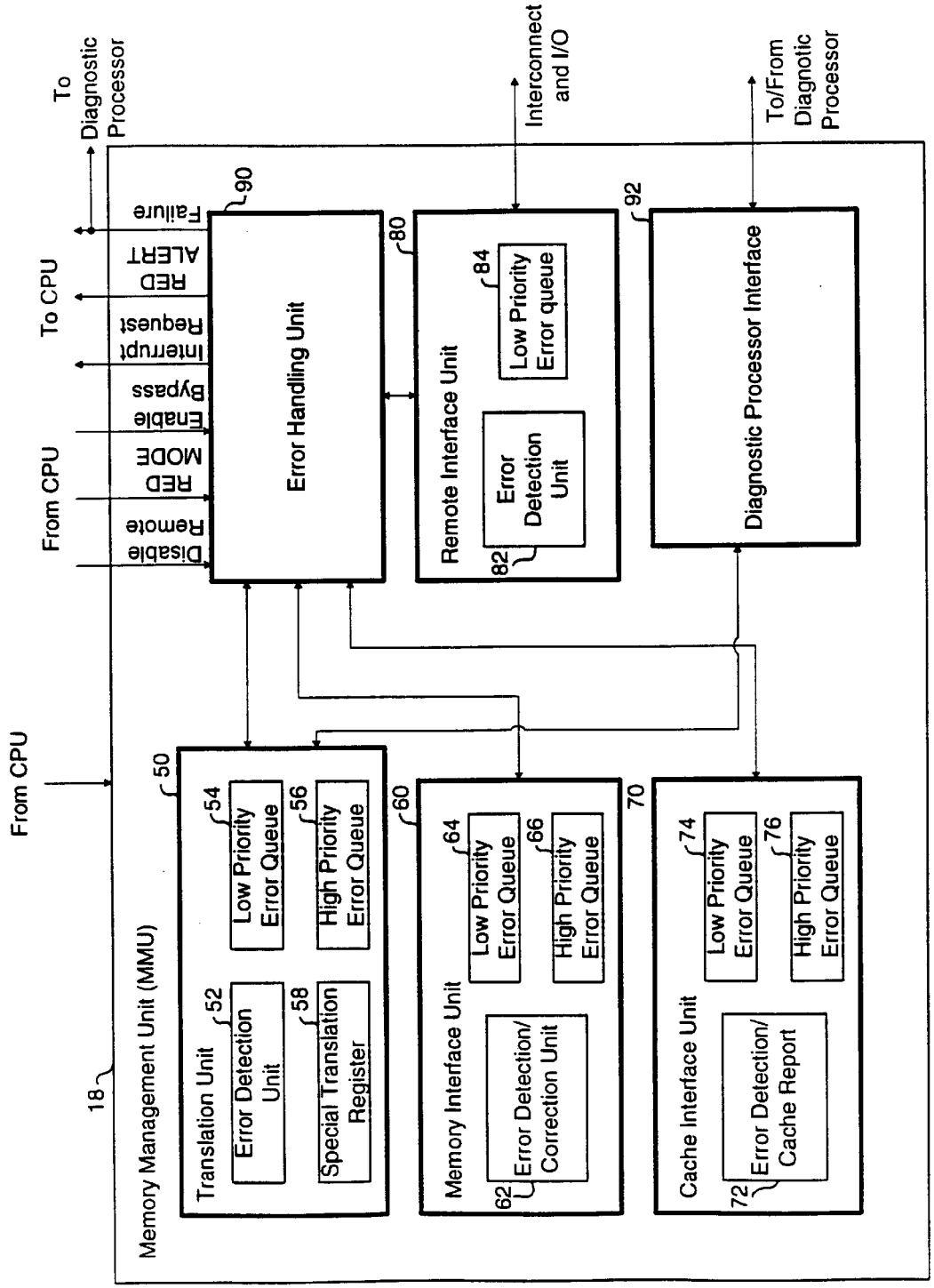
FIG. 2 is a more detailed block diagram of the memory management unit 18 of the present invention.

The MMU 18 is shown in greater detail in FIG. 2. As shown, MMU 18 preferably comprises a translation unit 50, a memory interface unit 60, a cache interface unit 70, a remote interface unit 80, an error handling unit 90, and a diagnostic processor interface 92. With regard to translation unit 50, it is this unit 50 which translates or maps the virtual addresses received from the CPU 12 into addresses which can be used to access the memory 20. In the preferred embodiment, unit 50 comprises an error detection unit 52 for detecting possible translation errors, a low priority error queue 54 for storing low priority error information, a high priority error queue 56 for storing high priority error information, and a special translation register 58 for storing an address translation used in the error handling process. Preferably, each of the error queues 54, 56 contains a plurality of entries so that more than one set of error information can be stored in each.

In normal operation, translation unit 50 receives and translates virtual addresses from the CPU using translation tables (not shown) within the translation unit 50. In the course of carrying out this translation function, the error detection unit 52 of unit 50 checks the address translations for possible errors caused by hardware failures. If a low priority error (i.e. an error which does not require immediate attention from the CPU 12, such as a single bit hardware correctable error) is detected, then the error is logged into an entry of the low priority error queue 54. Preferably, the information stored in queue 54 includes specific error information such as the type of error, where the error occurred, and information relating to the nature of the error. If one or more entries are logged into the low priority error queue 54, then queue 54 will send a low priority error signal to the error handling unit 90.

On the other hand, if a high priority error (i.e. an error which prevents the current access from being completed, such as a multiple bit non-correctable error) is detected, then an entry is entered into the high priority error queue 56. This entry preferably includes specific error information such as error type, location of error, and information relating to the nature of the error. If one or more entries are loaded into the high priority error queue 56, then queue 56 will send a high priority error signal to the error handling unit 90. As an additional function, the high priority error queue 56 preferably generates and sends an overflow signal to the error handling unit 90 if an attempt is made to write an entry to the queue 56 when the queue 56 is full. This overflow signal indicates to the error handling unit 90 that more errors have been encountered than the queue 56 can handle. As will be explained in a subsequent section, the low priority error signal, the high priority error signal, and the overflow signal are processed by the error handling unit 90 to determine the proper course of action.

With regard to the memory interface unit 60, it is this unit 60 which takes the translated addresses from the translation unit 50 and uses the translated addresses to access the memory 20 to retrieve information therefrom. Memory interface unit 60 preferably comprises an error detection/correction unit 62, a low priority error queue 64, and a high priority error queue 66. Queues 64 and 66 are substantially identical to queues 54 and 56 of the translation unit 50. In performing the interfacing function, the error correction unit 62 of unit 60 checks information from the memory 20 for possible errors caused by hardware failures. If a low priority error such as a single bit hardware correctable error is detected, then detection/correction unit 62 preferably corrects the error and thereafter logs the error into an entry of the low priority queue 64. One or more entries in the low priority error queue 64 will cause the queue 64 to send a low priority error signal to the error handling unit 90. If instead a high priority error such as a multiple bit non-correctable error is detected, then unit 62 preferably writes an entry into the high priority error queue 66. One or more entries in the high priority error queue 66 causes the queue 66 to send a high priority signal to the error handling unit 90. In addition, if the error detection/correction unit 62 attempts to write an entry into queue 64 when the queue is already full, then queue 64 generates and sends an overflow signal to the error handling unit 90.

The cache interface unit 70 of MMU 18 is the unit which handles the exchange of information between the caches 14, 16 and the MMU 18. More specifically, the cache interface unit 70 handles the loading of information retrieved from memory 20 into the caches 14, 16, and the storing of information from the caches 14, 16 into memory 20. Interface unit 70 preferably comprises an error detection/cache report unit 72, a low priority error queue 74, and a high priority error queue 76. Queues 74 and 76 are preferably substantially identical to queues 54 and 56 of the translation unit 50. In the preferred embodiment, the caches 14, 16 preferably comprise mechanisms for detecting and correcting (if possible) the errors caused by hardware failures within the caches 14, 16; thus, unit 70 preferably does not perform this function. However, errors are preferably reported by the caches 14, 16 to unit 72 of the interface unit 70. In response, unit 72 preferably makes a determination with regard to the error reported. If the error is a low priority error, such as a single bit correctable error, then error information is written into an entry of the low priority error queue 74. Writing one or more entries into queue 74 causes the queue 74 to send a low priority signal to the error handling unit 90. On the other hand, if the error is a high priority error, such as a multiple bit non-correctable error, then unit 72 writes error information into the high priority error queue 76. Writing one or more entries into queue 76 causes the queue to send a high priority error signal to the error handling unit 90. In addition, queue 76 preferably generates and sends an overflow signal to the error handling unit 90 if unit 72 attempts to write an entry into queue 76 when the queue is already full.

MMU 18 preferably further comprises a remote interface unit 80 for interacting with an interconnect system and the I/O devices coupled thereto. It is unit 80 which, for example, controls DMA access to the memory 20 by an I/O device. Preferably, unit 80 comprises an error detection unit 82 for detecting low priority errors coming from the interconnect system, and a low priority error queue 84. If a low priority error is detected, then unit 82 writes error information into an entry of queue 84. Writing one or more entries into queue 84 causes the queue to send a low priority error signal to the error handling unit 90.

Figure 3:
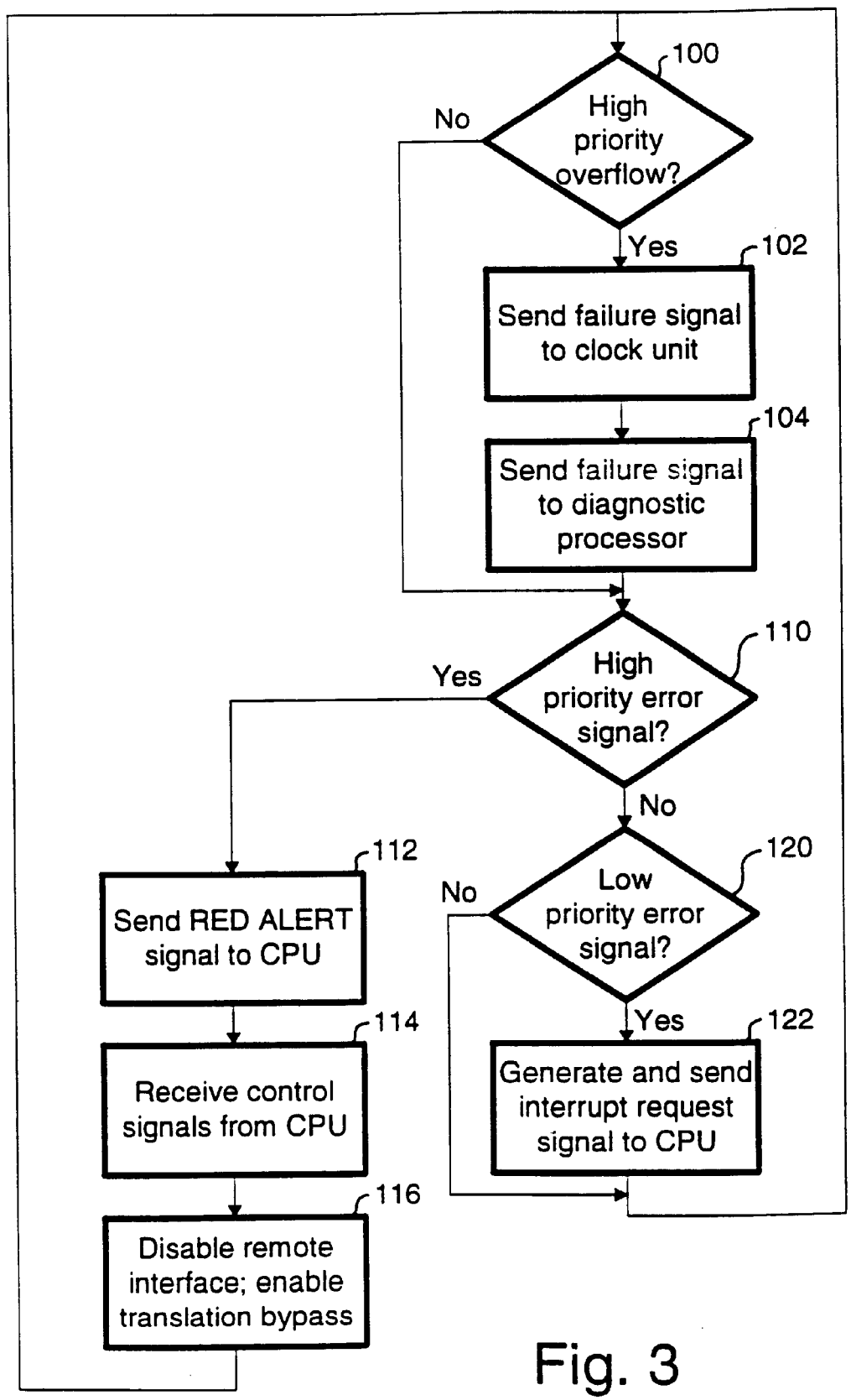
FIG. 3 is a flow diagram for the error handling unit 90 of FIG. 2.

The error handling unit 90 and the diagnostic processor interface 92 are the two units on the MMU 18 which are responsible for coordinating the prioritization and handling of errors. Preferably, error handling unit 90 receives all of the low priority error signals, high priority error signals, and overflow signals from all of the units 50, 60, 70, and 80. Armed with this information, unit 90 determines which course of action to take with regard to error prioritization and handling. FIG. 3 shows an operational flow diagram for error handling unit 90. Preferably, unit 90 begins operation by checking 100 for an overflow signal from one of the high priority error queues 56, 66, 76. If an overflow signal is detected, then it means that at least one of the units 50, 60, 70 has encountered more high priority errors or failures than it can handle. In such a case, the system 10 should be halted. To accomplish this, error handling unit 90 first sends 102 a failure signal to the clock unit 22 (FIG. 1). This serves to freeze the current state of the system 10. In addition, unit 90 sends 104 the failure signal to the diagnostic processor 24 (via scan engine 28) to inform the processor 24 that system failure has been experienced. In response, diagnostic processor 24 accesses and executes a scan control program 32 stored within the ROM 26. Under control of program 32, processor 24 interacts with the scan engine 28 to scan out the contents of the system components 12, 14, 16, 18. By so doing, the state of the system 10 is saved so that it may be later analyzed to determine the cause of the system failure.

Returning to step 100, if none of the overflow signals from error queues 56, 66, and 76 are asserted, then error handling unit 90 goes on to check 110 the status of the high priority error signals from the high priority error queues 56, 66, 76. If any one of these error signals is asserted, then it means that an error has occurred which requires the immediate attention of the CPU 12. In such a case, error handling unit 90 preferably generates and sends 112 a RED ALERT signal to the CPU 12. In response to this signal, the CPU 12 enters RED MODE, wherein a number of operations are performed. In RED MODE, CPU 12 first puts itself into sequential operation (i.e. processing only one instruction at a time) instead of superscalar operation. Second, CPU 12 invalidates and disables its on-chip cache, and also disables the instruction and data caches 14, 16. In addition, CPU 12 generates and sends several control signals to the MMU 18. These control signals include a RED MODE confirmation signal, a bypass signal, and a disable remote signal.

Upon receiving 114 these control signals from the CPU 12, the error handling unit 90 proceeds to step 116 to disable the remote interface unit 80 by sending a disable signal to the unit 80. This serves to block further I/O bus access by external I/O devices. Also, in step 116, error handling unit 90 enables the bypass feature of the translation unit 50 by sending an enable signal to the unit 50. Once activated, this bypass feature causes the translation unit 50 to deviate from its regular operation. Instead of using regular translation tables to performs its address translations, the translation unit in bypass mode uses the special translation register 58 to perform address translation. Preferably, register 58 contains a single address translation entry. After step 116 is performed, the system 10 is ready for RED MODE operation.

RED MODE operation preferably begins with the CPU 12 issuing a request for an instruction, the request preferably including a specific virtual address and a load command. This request is sent to the MMU 18, and more specifically, the virtual address is sent to the translation unit 50 and the command is sent to the diagnostic processor interface 92. In response, the translation unit 50 uses the special translation register 58 to provide a translated address for the virtual address. This translated address is sent to the diagnostic processor interface 92. In response, the diagnostic processor interface 92 sends the translated address and the load command to the diagnostic processor 24 for processing.

Upon receipt of the load command and the translated address, the diagnostic processor 24 processes the load command to retrieve information from the ROM 26 from a location indicated by the translated address. Preferably, the ROM 26 contains therein a section 34 wherein RED MODE code is stored, and preferably the translated address points to a location within section 34. By processing the load command, the diagnostic processor 24 is in effect retrieving a RED MODE instruction from the ROM 26 for the CPU 12 to execute. Once the instruction is retrieved, it is passed on to the diagnostic processor interface 92, which in turn, passes the instruction on to the CPU 12 for execution. Armed with this RED MODE instruction, the CPU 12 can begin executing RED MODE code to properly process the high priority errors. Preferably, the CPU 12 continues this process of fetching RED MODE code by way of the diagnostic processor 24 as long as RED MODE is invoked.

Under control of the RED MODE code, CPU 12 preferably processes the high priority error or errors by reading the high priority error queues 56, 66, 76. For each high priority error found in the queues 56, 66, 76, CPU 12 preferably carries out a proper procedure to rectify or to circumvent the error. The specific procedure carried out by the CPU 12 will depend on the nature of the error and the specific configuration of the system, and thus, is application-specific. Preferably, once CPU 12 is in RED MODE, it processes all of the high priority errors in the high priority error queues 56, 66, 76 before exiting RED MODE. Once an error is rectified, the corresponding entry in the high priority error queue is cleared. High priority errors are thus handled.

Returning to step 110, if none of the high priority error signals from queues 56, 66, 76 are asserted, then error handling unit 90 proceeds to step 120 to determine whether any of the low priority error signals from the low priority error queues 54, 64, 74, 84 are asserted. If one or more of these low priority error signals is asserted, then error handling unit 90 will generate 122 and send an interrupt request signal to the CPU 12 to inform the CPU 12 that a low priority error has occurred. The level of this interrupt request can be set by a user. Also, within the CPU 12, there is an interrupt mask register 30. The contents of this register 30, which can also be set by the user, are used to mask out certain interrupt signals. Depending on the interrupt level of the interrupt request, and the contents of the mask register 30, the CPU 12 may or may not process the interrupt immediately. If the CPU 12 does not service the interrupt, then error handling unit 90 preferably maintains the interrupt request signal in the active state. Operation of MMU 18 remains the same. Low priority errors continue to be stored into the low priority error queues 54, 64, 74. If these queues become full, then the new entries will simply overwrite the old entries. Since the low priority error entries are used primarily for logging purposes, overwriting some of the error entries will not adversely affect system operation.

If, on the other hand, the CPU 12 decides to service the interrupt, then the error entries in all of the low priority error queues 54, 64, 74 are read, processed, and then cleared by the CPU 12. Once that is done, the interrupt signal is deasserted and the system 10 returns to normal operation.

The present invention has been described with reference to a specific embodiment. It should be noted, however, that the invention should not be construed to be so limited. Various modifications may be made by one of ordinary skill in the art with the benefit of this disclosure without departing from the spirit of the invention. Therefore, the present invention should not be limited by the examples used to illustrate it but only by the scope of the appended claims.

What is claimed is:

1. A method for prioritizing and handling memory errors in a computer having a memory and a processing unit, the computer operating responsive to a clock, the method comprising the steps of:

detecting the occurrence of a memory error;

identifying the memory error as either a low priority memory error or a high priority memory error;

storing in a low priority error queue an address of the memory error identified as a low priority memory error;

storing in a high priority error queue an address of the memory error identified as a high priority memory error; and disabling the clock in response to an attempt to store more than a predetermined number of addresses in the high priority error queue.

2. The method for prioritizing and handling memory errors according to claim 1, further comprising the steps of:

sending an interrupt request signal to the processing unit responsive to storing the address of the low priority memory error in the low priority error queue; and sending a control signal to the processing unit to cause the processing unit to give immediate attention to the high priority memory error responsive to storing the address of the high priority memory error in the high priority error queue.

3. The method of claim 2 further comprising the steps of:

switching the processing unit to sequential operation if it is not already in sequential operation responsive to the processing unit receiving the interrupt request signal; and disabling a cache coupled to the processing unit responsive to the processing unit receiving the interrupt request signal.

4. The method for prioritizing and handling memory errors according to claim 1, in a computer also having a cache memory coupled to the processing unit, the method further comprising the steps of:

switching the processing unit if not already in sequential operation to sequential operation in response to the processing unit receiving the control signal; and disabling the cache memory responsive to the processing unit receiving the control signal.

5. The method for prioritizing and handling memory errors according to claim 1, wherein the step of storing the address of a low priority error in the low priority error queue further comprises the substep of:

overwriting a previously stored address if the low priority error queue is full.

6. A computer system, having a memory and operating responsive to a clock, for prioritizing and handling memory errors, comprising:

a processing unit;

a low priority error queue coupled to the processing unit for storing an address of a low priority memory error;

a high priority error queue coupled to the processing unit for storing an address of a high priority memory error; and an error handling unit coupled to the high priority error queue for providing a signal to disable the clock in response to an attempt to store more than a predetermined number of addresses in the high priority error queue.

7. The computer system of claim 6, wherein the error handling unit sends an interrupt request signal to the processing unit responsive to the address of the low priority memory error being stored in the low priority error queue.

8. The computer system of claim 6, wherein the error handling unit sends a control signal to the processing unit to cause the processing unit to give immediate attention to the high priority memory error responsive to the address of the high priority memory error being stored in the high priority error queue.

9. A method for prioritizing and handling memory errors in a computer having a memory and a processing unit, the computer operating responsive to a clock, the method comprising the steps of:

detecting the occurrence of a memory error;

identifying the type of memory error as either a first type or a second type;

storing in a first error queue an address of the memory error if the error is a first type of error;

storing in a second error queue an address of the memory error if the error is a second type of error;

detecting an overflow if more than a predetermined number of addresses are stored in the second error queue;

disabling the clock responsive to the detected overflow.

10. The method of claim 9, further comprising the steps of:

sending an interrupt request signal to the processing unit responsive to storing the address of the first type of memory error in the first error queue; and sending a control signal to the processing unit to cause the processing unit to give immediate attention to the second type of error responsive to storing the address of the second type of memory error in the second error queue.

11. The method of claim 10, in a computer also having a cache coupled to the processing unit, the method further comprising the steps of:

switching the processing unit to sequential operation if it is not already in sequential operation responsive to the processing unit receiving the control signal; and disabling the cache coupled to the processing unit responsive to the processing unit receiving the control signal.

12. The method of claim 9, wherein the step of storing the address of a first type of error in a first error queue further comprises the substep of, overwriting a previously stored address if tee first error queue is fill.

13. A computer system, having a memory and operating responsive to a clock, for prioritizing and handling memory errors comprising:

a processing unit;

a first error queue coupled to the processing unit for storing an address of a first type of memory error;

a second error queue coupled to the processing unit for storing an address of a second type of memory error; and an error handling unit coupled to the second error queue for sending a failure signal to the clock when the second error queue overflows.

14. The computer system of claim 13, wherein the error handling unit sends an interrupt request signal to the processing unit responsive to the address of the first type of memory error being stored in the first error queue.

15. The computer system of clam 13, wherein the error handling unit sends a control signal to the processing unit to cause the processing unit to give immediate attention to the second type of error responsive to the address of the second type of memory error being stored in the second error queue.

\* \* \* \* \*

UNITED STATES PATENT AND TRADEMARK OFFICE
CERTIFICATE OF CORRECTION

PATENT NO. : 6,446,224 B1 Page 1 of 1
DATED : September 3, 2002
INVENTOR(S) : Chih-Wei David Chang, Joel Frederick Boney and Jaspal Kohli It is certified that error appears in the above-identified patent and that said Letters Patent is hereby corrected as shown below:

<u>Title page,</u>
Item [56], References Cited, please add the following references:

U.S. PATENT DOCUMENTS
-- 5,675,759 A        10/97        Shebanow et al.        395/393 --

-- FOREIGN PATENT DOCUMENTS
WO    9408287 A1    04/1994    G06F/9/38
EP    0540450 A1    10/1992    G06F/11/10
EP    0418457 A2    03/1990    G06F/11/10
WO    9002373 A1    03/1990    G06F/11/10
EP    0335507 A2    03/1989    G06F/11/00
DE    3421737 A1    12/1984    G06F/9/38 --

-- OTHER PUBLICATIONS
Hegde, A., "Error Detection and Correction with the IDT49C466", Microprocessors ad Microsystems, vol. 18. No. 10, Dec. 1994, pp. 613-620.
Gallagher, DM. et al.: "Dynamic Memory Disambiguation Using The Memory Conflict Buffer" ACM Sigplan Notices, vol. 29, no. 11, 1 November 1994, pp. 183-193.
Johnson, M: "Superscalar Microprocessor Design, Passage" Prentice Hall, New Jersey, US XP002027574, pp. 147-163. --

<u>Column 10,</u>
Line 27, delete "tee" and replace with -- the --.
Line 28, delete "fill" and replace with -- full --.

Signed and Sealed this

Twenty-second Day of July, 2003

JAMES E. ROGAN
*Director of the United States Patent and Trademark Office*